(12) United States Patent
Kamimura

(10) Patent No.: US 12,299,950 B2
(45) Date of Patent: May 13, 2025

(54) DETERMINING PARAMETERS OF ANCHOR BOXES USED IN A SLIDING WINDOW METHOD WHEN A BOUNDING BOX AND A CLASS OF AN OBJECT IN AN IMAGE ARE DETECTED USING A NEURAL NETWORK AND THE SLIDING WINDOW METHOD

(71) Applicant: NEC Corporation, Tokyo (JP)

(72) Inventor: Junichi Kamimura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 424 days.

(21) Appl. No.: 17/778,926

(22) PCT Filed: Dec. 6, 2019

(86) PCT No.: PCT/JP2019/047862
§ 371 (c)(1),
(2) Date: May 23, 2022

(87) PCT Pub. No.: WO2021/111622
PCT Pub. Date: Jun. 10, 2021

(65) Prior Publication Data
US 2023/0005237 A1    Jan. 5, 2023

(51) Int. Cl.
*G06K 9/62*     (2022.01)
*G06V 10/25*    (2022.01)
(Continued)

(52) U.S. Cl.
CPC .......... *G06V 10/267* (2022.01); *G06V 10/25* (2022.01); *G06V 10/70* (2022.01); *G06V 10/72* (2022.01);
(Continued)

(58) Field of Classification Search
CPC ........ G06V 10/22; G06V 10/25; G06V 10/26; G06V 10/267; G06V 10/36; G06V 10/40;
(Continued)

(56) References Cited

U.S. PATENT DOCUMENTS 10,346,723 B2 * 7/2019 Han .................... G06V 10/42
10,410,096 B2 * 9/2019 Dijkman ............. G06V 10/255
(Continued)

OTHER PUBLICATIONS

International Search Report for PCT Application No. PCT/JP2019/047862, mailed on Jan. 28, 2020.
(Continued)

*Primary Examiner* — Eric Rush

(57) ABSTRACT

A detection object analysis unit (4) is a parameter determination apparatus that determines parameters of a plurality of anchor boxes to be used in a sliding window method when a bounding box and a class of an object in an image are detected using a neural network and the sliding window method. The detection object analysis unit (4) includes a distribution generation unit (11) that generates distribution information of parameters of bounding boxes indicated by object specifying information of a plurality of pieces of learning data. The detection object analysis unit (4) includes a clustering processing unit (12) that generates a plurality of clusters by clustering the distribution information. The detection object analysis unit (4) includes a parameter determination unit (13) that determines the parameters of the plurality of anchor boxes based on the plurality of clusters.

4 Claims, 8 Drawing Sheets

(51) Int. Cl.
*G06V 10/26* (2022.01)
*G06V 10/70* (2022.01)
*G06V 10/72* (2022.01)
*G06V 10/762* (2022.01)
*G06V 10/82* (2022.01)

(52) U.S. Cl.
CPC ............ *G06V 10/763* (2022.01); *G06V 10/82* (2022.01); *G06T 2207/20021* (2013.01); *G06T 2210/12* (2013.01); *G06V 2201/07* (2022.01)

(58) Field of Classification Search
CPC ...... G06V 10/44; G06V 10/454; G06V 10/50; G06V 10/70; G06V 10/72; G06V 10/74; G06V 10/75; G06V 10/751; G06V 10/7515; G06V 10/762; G06V 10/763; G06V 10/764; G06V 10/765; G06V 10/771; G06V 10/772; G06V 10/82; G06V 10/96; G06V 2201/07; G06T 7/00; G06T 7/10; G06T 7/11; G06T 7/70; G06T 7/73; G06T 7/74; G06T 2207/20021; G06T 2207/20081; G06T 2207/20084; G06T 2210/12; G06N 3/02; G06N 3/04; G06N 3/045; G06N 3/0464; G06N 3/08; G06N 20/00; G06F 18/21; G06F 18/211; G06F 18/2113; G06F 18/2115; G06F 18/232; G06F 18/2321; G06F 18/23211; G06F 18/23213; G06F 18/24; G06F 18/241; G06F 18/26; G06F 18/28

USPC ....... 382/100, 103, 155–157, 159, 160, 173, 382/181, 190, 192, 195, 203, 216, 224, 382/225, 228, 282, 293, 291; 706/12, 706/14–16, 19–21, 25, 45–48, 61
See application file for complete search history.

(56) References Cited

U.S. PATENT DOCUMENTS

| | | | |
|---|---|---|---|
| 2017/0206431 A1* | 7/2017 | Sun | G06V 10/454 |
| 2018/0157386 A1* | 6/2018 | Su | G06V 10/82 |
| 2018/0189596 A1* | 7/2018 | Lee | G06V 10/25 |
| 2019/0005358 A1* | 1/2019 | Pisoni | G06V 10/82 |
| 2019/0102646 A1 | 4/2019 | Redmon et al. | |
| 2020/0167601 A1* | 5/2020 | Deng | G06T 7/269 |
| 2020/0258254 A1* | 8/2020 | Packwood | G06T 7/11 |
| 2021/0056708 A1* | 2/2021 | Li | G06T 7/11 |

OTHER PUBLICATIONS

Ren, Shaoqing, et al., "Faster R-CNN: Towards Real-Time Object Detection with Region Proposal Networks". Advances in neural information processing systems, Jun. 4, 2015.
Redmon, Joseph, et al., "You Only Look Once: Unified, Real-Time Object Detection", Proceedings of the IEEE conference on computer vision and pattern recognition, May 9, 2016.

* cited by examiner

DETERMINING PARAMETERS OF ANCHOR BOXES USED IN A SLIDING WINDOW METHOD WHEN A BOUNDING BOX AND A CLASS OF AN OBJECT IN AN IMAGE ARE DETECTED USING A NEURAL NETWORK AND THE SLIDING WINDOW METHOD

This application is a National Stage Entry of PCT/JP2019/047862 filed on Dec. 6, 2019, the contents of all of which are incorporated herein by reference, in their entirety.

TECHNICAL FIELD

The present invention relates to a parameter determination apparatus, a parameter determination method, and a non-transitory computer readable medium.

BACKGROUND ART

In recent years, a number of techniques for detecting objects by artificial intelligence using deep learning have been proposed.

Object detection means estimate what an object in an image is and concurrently estimate the position and the size of the object by surrounding the object with a rectangle called a bounding box.

In deep learning used in artificial intelligence, a learning method called supervised learning has been mainly performed. Supervised learning is a mechanism in which a machine analyzes data to which a human has imparted a ground truth and learns this data so that the machine will be able to derive the ground truth. When object detection is performed, artificial intelligence performs learning using learning data indicating where in an image an object is present and what this object is. That is, a neural network used in object detection outputs a bounding box and a class of an object in an input image using a learned model learned using a learning data set formed so as to include a plurality of pieces of learning data, each of which includes an image that shows at least one object and object specifying information indicating the bounding box and the class of the object. The learning data set may include from thousands to tens of thousands of pieces of learning data.

FIG. 7 illustrates images included in one piece of learning data.

The object specifying information is information indicating the bounding box and the class of the object. The information indicating the bounding box may generally include coordinate data (x, y) of the upper left point of the bounding box and the size data (the height and the width) of the bounding box. Therefore, the information included in the learning data shown in FIG. 7 may include the images themselves shown in FIG. 7 and five object specifying information items. The five object specifying information items may be expressed by, for example, (dog, x1, y1, h1, h1), (dog, x2, y2, h2, w2), (giraffe, x3, y3, h3, w3), (bike, x4, y4, h4, w4), and (tower, x5, y5, h5, w5). Note that the coordinate data may not be the coordinate data of the upper left point of the bounding box, and may instead be, for example, coordinate data of the lower right point of the bounding box or coordinate data of the centroid of the bounding box.

In the field of object detection, when artificial intelligence learns given data, a sliding window method has often been employed.

The sliding window method is a method of searching for an object candidate area by shifting a plurality of anchor boxes having different scales and aspect ratios by a certain number of pixels. The anchor boxes are moved across the image to search for objects, and image features of a part with a large overlap area with a ground truth rectangle are used for learning. The anchor boxes have various sizes and aspect ratios, and a countless number of anchor boxes are scattered throughout the image. In the neural network, when the position of an object is estimated, the position of the bounding box of the object and the category of the object are estimated by obtaining image features regarding an area near each anchor box. When the position of the bounding box of the object and the category of the object are learned, the deviations between the position of the bounding box and the category of the object that have been estimated and the position of the bounding box and the category of the object of the ground truth of training data with the largest area overlapping with its anchor box are calculated, and the neural network is repeatedly adjusted in such a way that the deviations become small. The category of the object means the same as the class of the object.

Reference URL: datasciencecentral.com/profiles/blogs/autonomous-driving-car-detection-with-yolo-model-with-keras-in The technique disclosed in Non-Patent Literature 1 enables object detection by deep learning by using an identifier that separately performs estimation of the position of the object rectangle and estimation of the category. The technique disclosed in Non-Patent Literature 1 includes an identifier that outputs the positions of object rectangles from inside the image and an identifier that outputs the categories of the object area candidates.

The technique disclosed in Non-Patent Literature 2, which focuses on using features having a plurality of scales, enables object detection in which estimation of object candidate areas and estimation of the categories are performed, which are separately performed in Non-Patent Literature 1, to be concurrently performed.

CITATION LIST

Non Patent Literature

[Non Patent Literature 1] Ren, Shaoqing, et al. "Faster r-cnn: Towards real-time object detection with region proposal networks." Advances in neural information processing systems. 2015.

[Non Patent Literature 2] Redmon, Joseph, et al. "You only look once: Unified, real-time object detection." Proceedings of the IEEE conference on computer vision and pattern recognition. 2016.

SUMMARY OF INVENTION

Technical Problem

In the aforementioned object detection systems disclosed in Non-Patent Literature 1 and 2, the scales, the aspect ratios, and the number of anchor boxes are hyperparameters, which need to be set manually. Therefore, a number of anchor boxes are set so that they correspond to objects having various shapes. However, the scales and the aspect ratios of the bounding boxes that specify the areas of objects are often limited, and depending on target objects to be detected, there are many anchor boxes that are not actually used for learning.

An object of the present invention is to reduce the load of object detection processing.

Solution to Problem

According to a first aspect of the present invention, a parameter determination apparatus for determining parameters of a plurality of anchor boxes to be used in a sliding window method when a bounding box and a class of an object in an image are detected using a neural network and the sliding window method, in which the neural network outputs a bounding box and a class of an object in an input image using a learned model learned using a learning data set formed so as to include a plurality of pieces of learning data, each of which includes an image that shows at least one object and object specifying information indicating the bounding box and the class of the object, the parameter determination apparatus including: a distribution generation unit configured to generate distribution information of parameters of bounding boxes indicated by the object specifying information of the plurality of pieces of learning data; a clustering unit configured to generate a plurality of clusters by clustering the distribution information; and a parameter determination unit configured to determine the parameters of the plurality of anchor boxes based on the plurality of clusters is provided.

According to a second aspect of the present invention, a parameter determination method for determining parameters of a plurality of anchor boxes to be used in a sliding window method when a bounding box and a class of an object in an image are detected using a neural network and the sliding window method, in which the neural network outputs a bounding box and a class of an object in an input image using a learned model learned using a learning data set formed so as to include a plurality of pieces of learning data, each of which includes an image that shows at least one object and object specifying information indicating the bounding box and the class of the object, the parameter determination method including: generating distribution information of parameters of bounding boxes indicated by the object specifying information of the plurality of pieces of learning data; generating a plurality of clusters by clustering the distribution information; and determining the parameters of the plurality of anchor boxes based on the plurality of clusters is provided.

Advantageous Effects of Invention

According to the present invention, the load of object detection processing may be reduced.

DESCRIPTION OF EMBODIMENTS

First Embodiment

Figure 1:
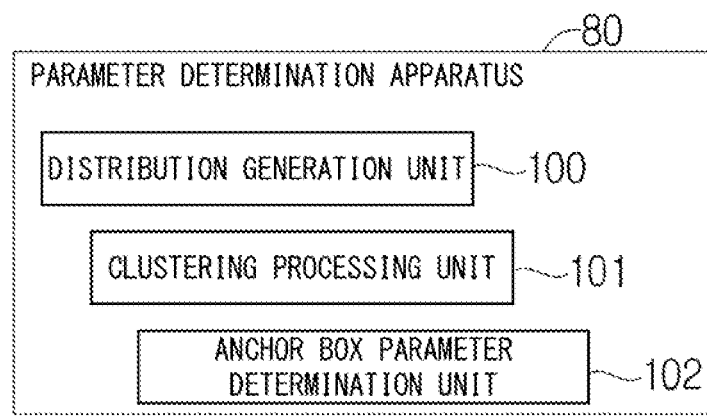
FIG. 1 is a functional block diagram of a parameter determination apparatus (first embodiment)

Hereinafter, with reference to FIG. 1, a first embodiment will be described. FIG. 1 shows a parameter determination apparatus 80 that determines parameters of a plurality of anchor boxes used in a sliding window method for object detection. The parameter determination apparatus 80 determines parameters of a plurality of anchor boxes used in the sliding window method when a bounding box and a class of an object in an image are detected using a neural network and the sliding window method.

The neural network outputs the bounding box and the class of an object in an input image using a learned model learned using a learning data set formed so as to include a plurality of pieces of learning data, each of which includes an image that shows at least one object and object specifying information indicating the bounding box and the class of the object. That is, the learned model is a model learned using the learning data set. The learning data set includes a plurality of pieces of learning data. The learning data includes an image that shows at least one object and object specifying information indicating the bounding box and the class of the object.

The parameter determination apparatus 80 includes a distribution generation unit 100 that generates distribution information of parameters of bounding boxes indicated by object specifying information of a plurality of pieces of learning data.

The parameter determination apparatus 80 includes a clustering processing unit 101, which is a clustering unit configured to cluster the distribution information and generate a plurality of clusters.

The parameter determination apparatus 80 includes an anchor box parameter determination unit 102, which is a parameter determination unit configured to determine parameters of a plurality of anchor boxes based on the plurality of clusters.

According to the aforementioned configuration, it is possible to reduce the load of processing of detecting the bounding box and the class of an object in an image. That is, the load of object detection processing may be reduced.

Second Embodiment

Figure 2:
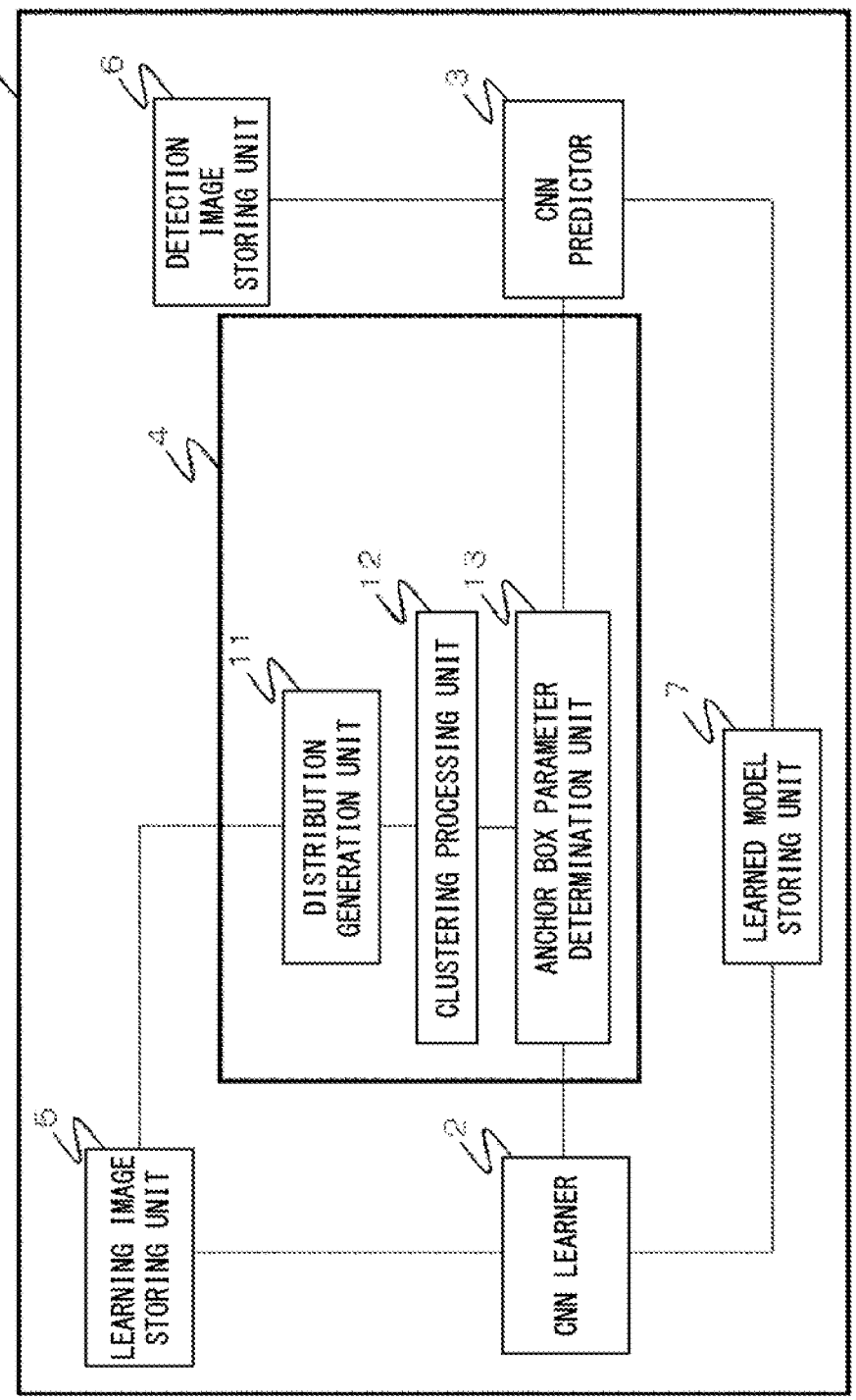
FIG. 2 is a functional block diagram of an object detection system (second embodiment)

FIG. 2 is a functional block diagram of the object detection system 1. The object detection system 1 includes a Central Processing Unit (CPU), a readable/writable Random Access Memory (RAM), and a Read Only Memory (ROM). The CPU loads a control program stored in the ROM and executes the loaded control program, whereby the control program causes hardware such as the CPU to function as various functional units. The various functional units include a CNN learner 2, a CNN predictor 3, a detection object analysis unit 4, which is a parameter determination apparatus, a learning image storing unit 5, a detection image storing unit 6, and a learned model storing unit 7.

The learning image storing unit 5 stores a learning data set to be used for learning by the CNN learner 2.

That is, the neural network used in object detection outputs the bounding box and the class of an object in the input image using a learned model learned using a learning data set formed so as to include a plurality of pieces of learning data, each including an image that shows at least one object and object specifying information indicating the bounding box and the class of the object. That is, the learned model is a model learned using the learning data set. The learning data set includes a plurality of pieces of learning data. The learning data includes an image that shows at least one object and object specifying information indicating the bounding box and the class of the object. The learning data set may include thousands to tens of thousands of pieces of learning data.

Figure 7:
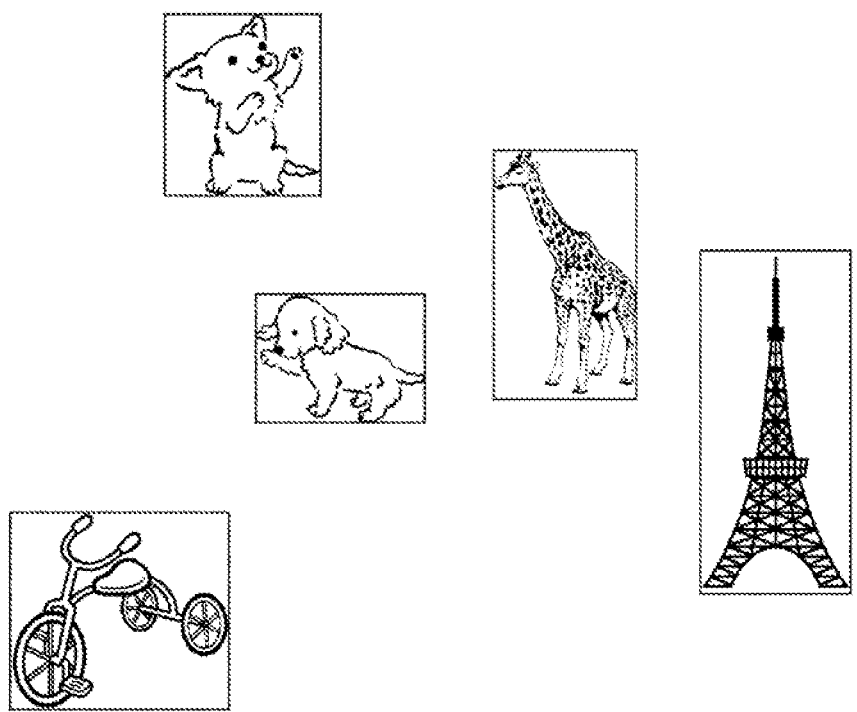
FIG. 7 is a diagram illustrating image data for learning (second embodiment).

FIG. 7 illustrates images included in one piece of learning data.

The object specifying information is information indicating the bounding box and the class of the object. The information indicating the bounding box may generally include coordinate data (x, y) of the upper left point of the bounding box and the size data (the height and the width) of the bounding box. Therefore, the information included in the learning data shown in FIG. 7 may include the images themselves shown in FIG. 7 and five object specifying information items. The five object specifying information items may be expressed by, for example, (dog, x1, y1, h1, h1), (dog, x2, y2, h2, w2), (giraffe, x3, y3, h3, w3), (bike, x4, y4, h4, w4), and (tower, x5, y5, h5, w5). Note that the coordinate data may not be the coordinate data of the upper left point of the bounding box, and may instead be, for example, coordinate data of the lower right point of the bounding box or coordinate data of the centroid of the bounding box.

The bounding boxes that surround the respective objects in FIG. 7 are drawn only for convenience of the explanation and are not actually present on the images for learning.

The detection image storing unit 6 stores images used for object detection by the CNN predictor 3. The images for object detection, which are similar to those shown in FIG. 7, are images each including at least one object.

The CNN learner 2 acquires the learning data set stored in the learning image storing unit 5, and performs learning so as to receive images included in each piece of learning data and output the corresponding object specifying information, thereby generating a learned model, which is a prediction model for object detection. The CNN learner 2 stores the learned model that has been generated in the learned model storing unit 7.

The CNN predictor 3 outputs the bounding box and the class of the object to be detected from the detection image using the learned model stored in the learned model storing unit 7. Specifically, the CNN predictor 3 outputs the reliability of the bounding box and the class of the object to be detected from the detection image using the learned model.

The detection object analysis unit 4 determines parameters of a plurality of anchor boxes used in the sliding window method when the bounding box and the class of the object in the image are detected using the neural network and the sliding window method. The detection object analysis unit 4 is shared by the CNN learner 2 and the CNN predictor 3. The detection object analysis unit 4 includes a distribution generation unit 11, a clustering processing unit 12, which is a clustering unit, and an anchor box parameter determination unit 13, which is a parameter determination unit. The detection object analysis unit 4 is connected to the CNN learner 2 and the CNN predictor 3. The detection object analysis unit 4 determines parameters of anchor boxes used in the CNN learner 2 and the CNN predictor 3. The parameters of an anchor box are generally the size (the height and the width) of the anchor box. Alternatively, the parameters of the anchor box may be one or both of the scale and the aspect ratio of the anchor box. The detection object analysis unit 4 determines the parameters of the anchor boxes used for the learning by the CNN learner 2 and the prediction by the CNN predictor 3 based on the learning data set.

The distribution generation unit 11 loads the learning data set stored in the learning image storing unit 5 to generate distribution information of parameters of bounding boxes indicated by object specifying information of a plurality of pieces of learning data. Specifically, the distribution generation unit 11 generates distribution information indicating the distribution of scales and aspect ratios of the respective bounding boxes. The distribution generation unit 11 may generate distribution information indicating the distribution of the width dimensions and the height dimensions of the respective bounding boxes. In this case, the distribution generation unit 11 may generate distribution information indicating the distribution of the width dimensions and the height dimensions of the respective bounding boxes by plotting each of the bounding boxes in a two-dimensional space in which, for example, the vertical axis indicates the height and the horizontal axis indicates the width based on the height dimension and the width dimension of this bounding box.

The clustering processing unit 12 generates a plurality of clusters by clustering the distribution information of the parameters of the bounding boxes indicated by the object specifying information of the plurality of pieces of learning data. Specifically, the clustering processing unit 12 clusters plots indicating the parameters of the plurality of bounding boxes plotted in the two-dimensional space into several sets.

Since the number of anchor boxes disclosed in Non-Patent Literature 1 is 9, the number of sets generated by clustering is preferably, but not limited to, nine in order to reduce the load of the processing. Further, the clustering processing unit 12 performs clustering by applying a weight in such a way that within-cluster variance increases in proportion to the scale of the bounding box. The clustering method may generally be a K-means method. In the K-means method, first, clusters are randomly assigned to the plots and the centroid of each cluster is obtained. Next, the clusters assigned to the plots are each changed to a cluster having the centroid to a cluster whose centroid is the closest to each plot. The calculation of the centroid and the change in the clusters are repeated until when there is no longer any change in the clusters. At this time, distance calculation in view of the scale of the bounding box is performed, whereby clustering with different within-cluster variance is achieved.

The anchor box parameter determination unit 13 determines parameters of the anchor boxes from the results of clustering performed by the clustering processing unit 12. The parameters may either be the scale and the aspect ratio or the width dimension and the height dimension. Each cluster on the space indicates a range in which a single anchor box that corresponds to this cluster is applied. That is, by determining the parameters of the anchor boxes based on the centroids of the respective clusters, all the anchor boxes are able to cover the learning data set with a good balance. Further, since the base of the distribution information indicates the width and the height, it is possible to determine, from the coordinates of the centroid of each of the clusters, the scale and the aspect ratio of the anchor box that corresponds to this cluster.

After the parameters of the anchor boxes are determined, these anchor boxes, which are used as sliding windows, are slid in the image (actually they are evenly scattered in the image), and thus the bounding box and the class of the object may be estimated using the image features of only the area included in each anchor box.

Figure 3:
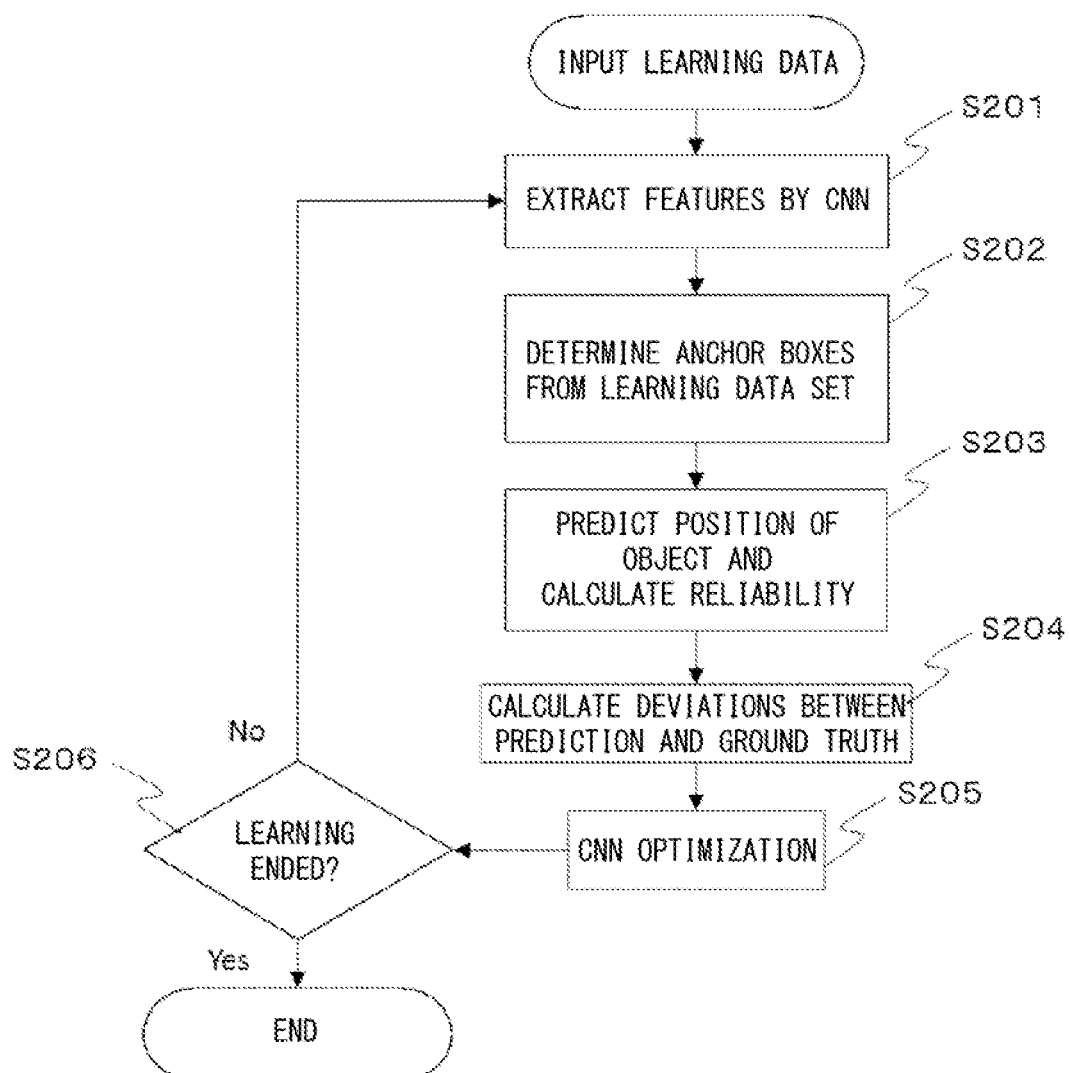
FIG. 3 is a flowchart showing processing of the object detection system at the time of learning (second embodiment)
Figure 4:
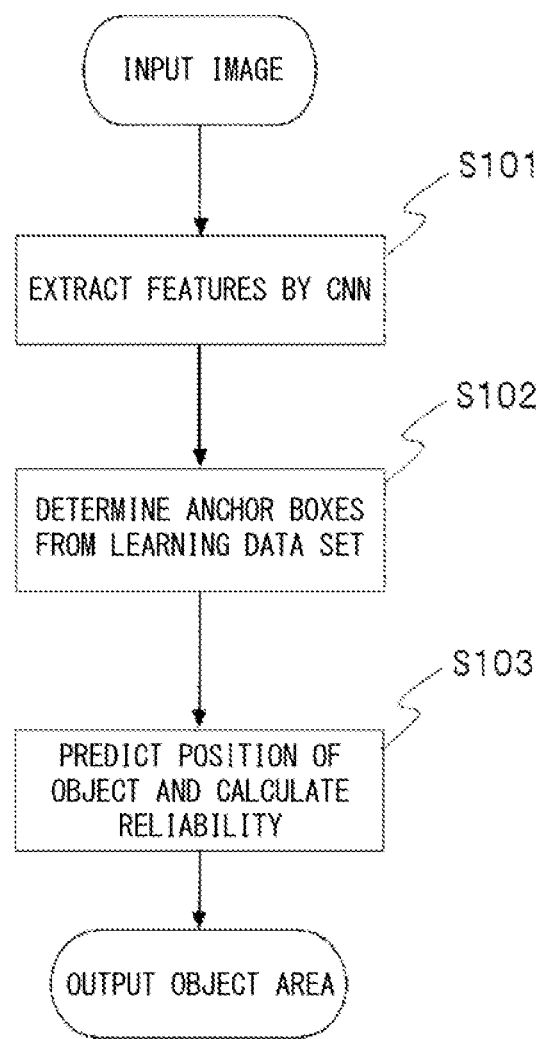
FIG. 4 is a flowchart showing processing of the object detection system at the time of prediction (second embodiment)

Referring next to FIGS. 3 and 4, operations of the object detection system 1 will be described. FIG. 3 is a flowchart of an operation of the object detection system 1 at the time of learning. FIG. 4 is a flowchart of the operation of the object detection system 1 at the time of object detection (at the time of prediction).

As shown in FIG. 3, the CNN learner 2 receives the learning data set for learning from the learning image storing unit 5 and extracts the features for the object detection (Step S201). The detection object analysis unit 4 receives the learning data set for learning from the learning image storing unit 5 and determines the scales and the aspect ratios of the anchor boxes (Step S202). The CNN learner 2 searches for an object in the image using the anchor boxes determined by the detection object analysis unit 4 as sliding windows, and calculates the reliability for each bounding box and for each class of the object from the features that correspond to the object (S203). The deviations between the ground truth bounding box that the operator has given and the predicted bounding box are calculated based on the ground truth bounding box and reliability for each class that the operator has given (Step S204). The CNN learner 2 optimizes the prediction model in such a way that the deviations become small (S205). It is determined whether the optimization of the prediction model has been performed a predetermined number of times (Step S206). When it is determined that the optimization of the prediction model has been performed the predetermined number of times (S206: YES), the CNN learner 2 stores the prediction model in the learned model storing unit 7 as a learned model, and ends the processing. When it is determined that the optimization of the prediction model has not yet been performed the predetermined number of times (S206: NO), the CNN learner 2 returns the processing to S201.

The CNN predictor 3 receives an image from the detection image storing unit 6 and the learned model from the learned model storing unit 7. As shown in FIG. 4, the CNN predictor 3 calculates the features of the image for object detection (Step S101). The detection object analysis unit 4 receives the learning data set for learning from the learning image storing unit 5 and determines the scales and the aspect ratios of the anchor boxes (Step S102). Since the scales and the aspect ratios of the anchor boxes have already been determined in Step S202, Step S102 can be omitted. The CNN predictor 3 searches for an object in the image using the parameters of the anchor boxes that have been determined, calculates the reliability for each bounding box and for each class of the object from the features of the part corresponding to the object, and outputs the calculated results (S103).

Next, effects of this example embodiment will be described.

In this example embodiment, the detection object analysis unit 4 is configured to automatically determine parameters of the anchor boxes in accordance with the learning data set, which enables the anchor boxes being used for object detection to be limited to the anchor boxes that fit the object to be detected, whereby it is possible to reduce the load of the processing of the identifiers, that is, the CNN learner 2 and the CNN predictor 3 while maintaining the accuracy of detecting the object.

Figure 5A:
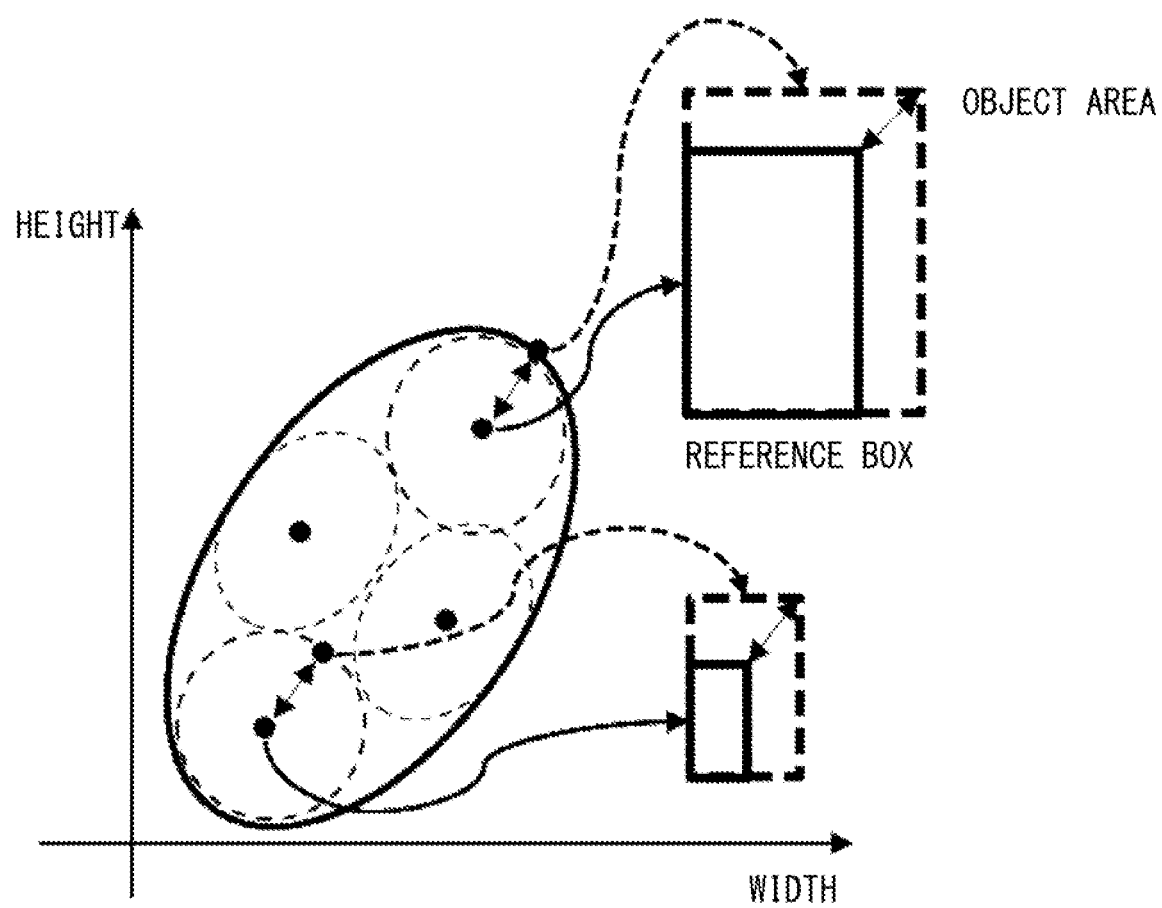
FIG. 5A is an explanatory diagram of clustering (second embodiment)
Figure 5B:
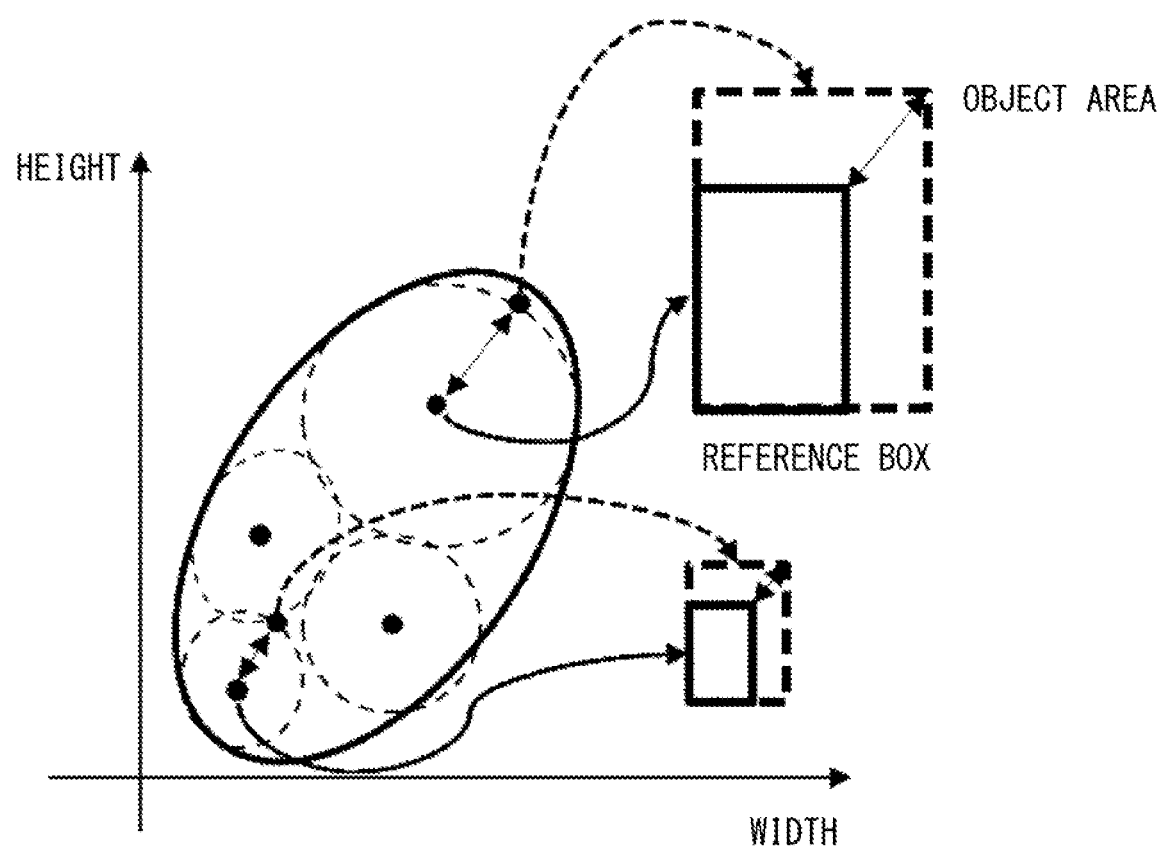
FIG. 5B is a an explanatory diagram of clustering (second embodiment)

Further, in this example embodiment, the clustering processing unit 12 is configured to perform clustering by weighting the within-cluster variance, whereby it is possible to stabilize learning. FIGS. 5A and 5B each show one example of the processing of the clustering processing unit 12. In FIGS. 5A and 5B, the distribution of the parameters of bounding boxes is divided into four clusters. FIG. 5A shows a case in which the within-cluster variance is constant and FIG. 5B shows a case in which the within-cluster variance is weighted in proportion to the scales of the bounding boxes. When the within-cluster variance is constant as shown in FIG. 5A, the variation in the relative values of the scale of the object to be detected covered by each anchor box increases. On the other hand, by weighting the within-cluster variance in proportion to the scales of the bounding boxes as shown in FIG. 5B, the variation in the relative values of the scale of the object to be detected covered by each anchor box decreases, and learning of the CNN learner 2 can be made stable.

Figure 6:
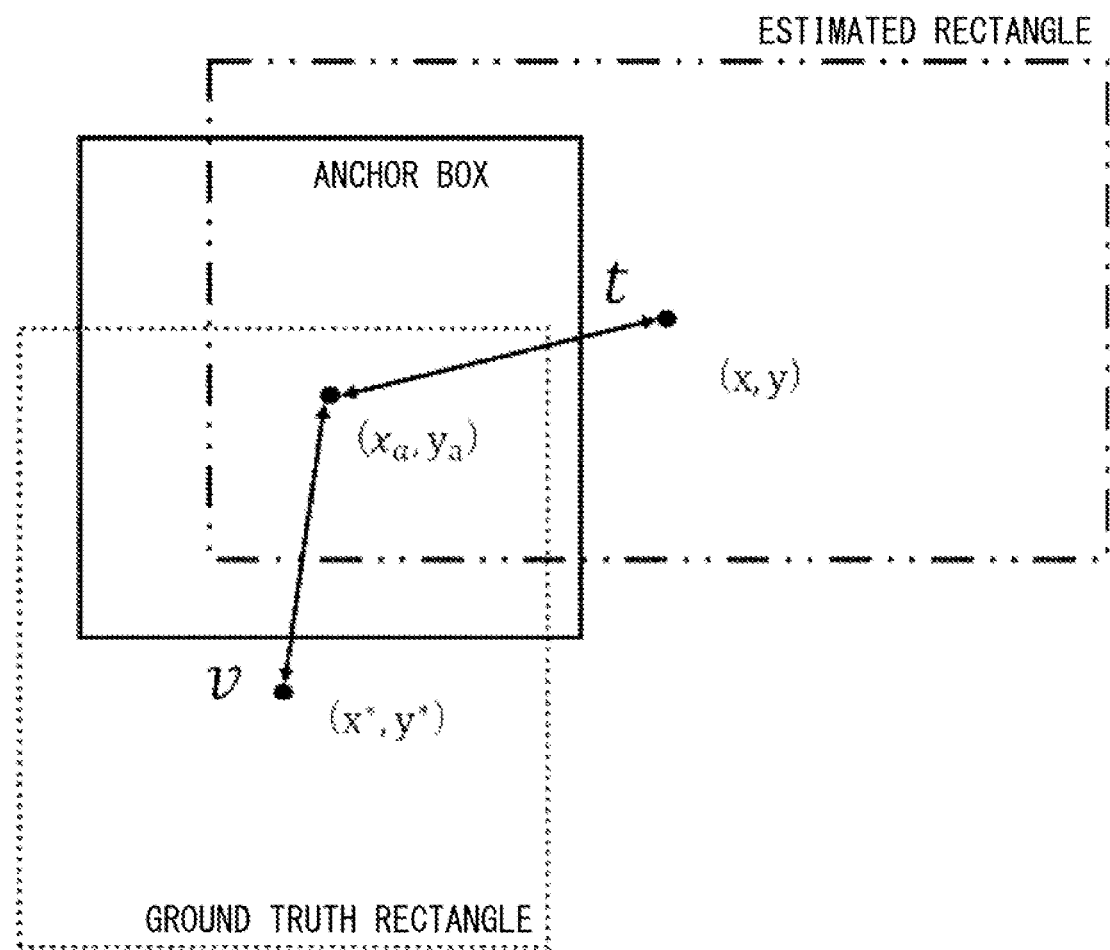
FIG. 6 is an explanatory diagram of a loss function (second embodiment)

Note that the optimization of the learning in the CNN learner 2 is performed by decreasing the loss function defined by the following expression. The loss function can be expressed by the following Expression (1). The following Expression (1) is composed of two elements. The former term Lcls(p,u) represents an error between an estimated class probability p of the object rectangle and a ground truth class probability u. The latter term Lloc(t,v) represents an error between an estimated rectangle t of the object which is based on the anchor box shown in FIG. 6 and a ground truth rectangle v. Lloc(t,v) can be expressed by the following Expression (2). The symbols x and y respectively indicate the x and y coordinates of the central position of the rectangle and the symbols w and h respectively indicate the width and the height of the rectangle. The symbols xa, ya, wa, and ha respectively indicate the X coordinate, the Y coordinate, the width, and the height of the central position of the anchor box. The symbols x, y, w, and h respectively indicate the X coordinate, the Y coordinate, the width, and the height of the central position of the estimated rectangle.

[Expression 1]
$$L = L_{cls}(p, u) + \lambda L_{loc}(t, v) \tag{1}$$

[Expression 2]
$$L_{loc}(t, v) = \sum_{i \in [x,y,w,h]} (t_i - v_i) \tag{2}$$

[Expression 3]
$$t_x = \frac{x - x_a}{w_a}, t_y = \frac{y - y_a}{h_a}, t_w = \log\left(\frac{w}{w_a}\right), t_h = \log\left(\frac{h}{h_a}\right) \tag{3}$$

While the preferable example embodiments of the present invention have been described above, the aforementioned example embodiments have the following features.

The detection object analysis unit 4 is a parameter determination apparatus that determines parameters of the plurality of anchor boxes used in the sliding window method when the bounding box and the class of the object in the image are detected using a neural network and the sliding window method.

The neural network outputs the bounding box and the class of an object in the input image using a learned model learned using a learning data set formed so as to include a plurality of pieces of learning data, each of which includes an image that shows at least one object and object specifying information indicating the bounding box and the class of the object.

The detection object analysis unit 4 includes the distribution generation unit 11 that generates distribution information of parameters of the bounding boxes indicated by the object specifying information of the plurality of pieces of learning data, the clustering processing unit 12 that generates a plurality of clusters by clustering distribution information, and the parameter determination unit 13 configured to determine parameters of a plurality of anchor boxes based on the plurality of clusters. According to the aforementioned configuration, it is possible to reduce the load of processing for object detection.

Further, the clustering processing unit 12 clusters the distribution information in such a manner that the within-cluster variance of each cluster increases in proportion to the scale of the bounding box. According to the aforementioned configuration, the variation in the relative values of the scale of the object to be detected covered by each anchor box decreases.

Further, the distribution generation unit 11 generates the distribution information of the vertical dimensions and the horizontal dimensions of parameters of the bounding boxes indicated by the object specifying information of the plurality of pieces of learning data and the parameter determination unit 13 determines the vertical dimensions and the horizontal dimensions of the plurality of anchor boxes.

The parameter determination method for determining parameters of a plurality of anchor boxes used in the sliding window method when the bounding box and the class of the object in the image are detected using the neural network and the sliding window method includes a distribution generation step (S202), a clustering step (S202), and a parameter determination step (S202). According to the aforementioned method, it is possible to reduce the load of processing for object detection.

In the aforementioned examples, the program(s) can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), CD-Read Only Memory (ROM), CD-R, CD-R/W, a Digital Versatile Disc (DVD), semiconductor memories (such as mask ROM, Programmable ROM (PROM), Erasable PROM (EPROM), flash ROM, Random Access Memory (RAM), etc.). Further, the program(s) may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

REFERENCE SIGNS LIST

80 Parameter Determination Apparatus
100 Distribution Generation Unit
101 Clustering Processing Unit
102 Anchor Box Parameter Determination Unit
2 CNN Learner
3 CNN Predictor
4 Detection Object Analysis Unit
5 Learning Image Storing Unit
6 Detection Image Storing Unit
7 Object Detection Model Storing Unit
11 Distribution Generation Unit
14 Clustering Processing Unit
13 Anchor Box Parameter Determination Unit

What is claimed is:

1. A parameter determination apparatus for determining parameters of a plurality of anchor boxes to be used in a sliding window method when a bounding box and a class of an object in an image are detected using a neural network and the sliding window method, wherein the neural network outputs a bounding box and a class of an object in an input image using a learned model learned using a learning data set formed so as to include a plurality of pieces of learning data, each piece of learning data of the plurality of pieces of learning data including an image that shows at least one object and object specifying information indicating a bounding box in the image that shows the at least one object and a class of the at least one object, the parameter determination apparatus comprising:

at least one memory storing computer-executable instructions; and at least one processor configured to access the at least one memory and execute the computer-executable instructions to:

generate distribution information of parameters of the bounding boxes indicated by the object specifying information of the plurality of pieces of learning data;

generate a plurality of clusters by clustering the distribution information, wherein generating the plurality of clusters includes clustering the distribution information in such a way that within-cluster variance of each cluster of the plurality of clusters increases in proportion to a scale of the bounding boxes indicated by the object specifying information of the plurality of pieces of learning data; and determine the parameters of the plurality of anchor boxes based on the plurality of clusters.

2. The parameter determination apparatus according to claim 1, wherein generating the distribution information includes generating distribution information on vertical dimensions and horizontal dimensions of the parameters of the bounding boxes indicated by the object specifying information of the plurality of pieces of learning data, and the at least one processor determines vertical dimensions and horizontal dimensions of the plurality of anchor boxes.

3. A computer-implemented parameter determination method for determining parameters of a plurality of anchor boxes to be used in a sliding window method when a bounding box and a class of an object in an image are detected using a neural network and the sliding window method, wherein the neural network outputs a bounding box and a class of an object in an input image using a learned model learned using a learning data set formed so as to include a plurality of pieces of learning data, each piece of learning data of the plurality of pieces of learning data including an image that shows at least one object and object specifying information indicating a bounding box in the image that shows the at least one object and a class of the at least one object, the parameter determination method being performed by at least one processor executing stored instructions to perform steps comprising:

generating distribution information of parameters of the bounding boxes indicated by the object specifying information of the plurality of pieces of learning data;

generating a plurality of clusters by clustering the distribution information, wherein generating the plurality of clusters includes clustering the distribution information in such a way that within-cluster variance of each cluster of the plurality of clusters increases in proportion to a scale of the bounding boxes indicated by the object specifying information of the plurality of pieces of learning data; and determining the parameters of the plurality of anchor boxes based on the plurality of clusters.

4. A non-transitory computer readable medium storing a program executable by a computer to perform the parameter determination method according to claim 3.

* * * * *